United States Patent [19]

Sumner

[11] Patent Number: 4,519,298

[45] Date of Patent: May 28, 1985

[54] MATERIAL HANDLING DEVICE

[75] Inventor: Leslie Sumner, Bath, England

[73] Assignee: Gallaher Limited, London, England

[21] Appl. No.: 599,270

[22] Filed: Apr. 11, 1984

Related U.S. Application Data

[60] Division of Ser. No. 468,488, Feb. 22, 1983, , which is a continuation of Ser. No. 211,244, Nov. 28, 1980, abandoned.

[51] Int. Cl.³ .............................. F16J 3/00; F04B 43/12
[52] U.S. Cl. ................................... 92/103 F; 417/477
[58] Field of Search .............. 92/103 F; 417/474–477; 418/45

[56] References Cited

U.S. PATENT DOCUMENTS

| 2,885,966 | 5/1959 | Ford | 417/477 |
| 3,829,251 | 8/1974 | Schwing | 417/477 |
| 4,332,534 | 6/1982 | Becker | 418/45 |

FOREIGN PATENT DOCUMENTS

| 82770 | 1/1957 | Denmark | 417/476 |
| 6243 | 6/1878 | Fed. Rep. of Germany | 417/477 |
| 2525744 | 12/1976 | Fed. Rep. of Germany | 418/45 |

Primary Examiner—William L. Freeh
Assistant Examiner—T. Olds
Attorney, Agent, or Firm—Fleit, Jacobson, Cohn & Price

[57] ABSTRACT

A material handling device such as a pump, including a first housing part 12 having an internal surface 12A surrounded by a peripheral surface 12B, 12C facing in generally the same direction as the internal surface. A substantially longitudinally inextensible flexible diaphragm has its periphery clamped on the first clamping surface by a cooperating second clamping surface 16B, 16C, the second housing part 16 which carries a rotary member 17 on which are mounted three rollers 18. A chamber 10 is formed between the diaphragm and the internal surface.

Upon rotation of the rotary member, the rollers sequentially urge the diaphragm onto the internal surface to form a constriction which traverses the chamber and moves the constriction from one port 13 to another port 14 formed in the first housing part.

The configuration of the pump is such that, as at least three deflectors move sequentially over the diaphragm, the sum of the distances measured along the diaphragm between the clamping points 12C, 16C of the diaphragm and the deflectors 18 adjacent thereto, and where appropriate, between the adjacent deflectors 18 remains substantially constant, thus allowing a substantially inextensible membrane to be used.

6 Claims, 3 Drawing Figures

MATERIAL HANDLING DEVICE

This is a divisional of application Ser. No. 468,488, filed Feb. 22, 1983, which is a continuation of application Ser. No. 211,244, filed Nov. 28, 1980, now abandoned.

The present invention relates to a diaphragm for a pump or motor device.

Rotary pumps have already been proposed, the so-called peristaltic type, which use a flexible tube bent in the arc of a circle, the tube being squeezed by a plurality of rollers carried on a rotating member which makes contact with the tube at angularly spaced positions. This results in "slugs" of the fluid carried in the tube being carried forward from the inlet of the tube to its outlet.

Such pumps are particularly suitable for services which require the fluid being pumped to be kept isolated from the mechanism itself, but its disadvantage is that the tube, if not restrained, "walks" in the direction of the outlet. In consequence, the anchoring of the tube to prevent this is a problem which increases with the size of the tube and the viscosity of the fluid being pumped. It is a further disadvantage of this type of pump, that, when pumping "heavy" substances, such as concrete, the tube tends to collapse at the inlet end and it is necessary to evacuate the chamber in which the pump tube operates in order to overcome this tendency.

Another disadvantage of this type of pump is the large effort required to distort the tube, especially when heavy duty tubes are used, e.g. in pumping concrete, which results in low mechanical efficiencies.

Diaphragm pumps have also been proposed, such as in German Patent No. 6243, British Patent Nos. 208,477; 562,409 and U.S. Pat. No. 2,794,400. These pumps include a housing having an internal surface, and a flexible resilient diaphragm mounted within the housing and secured thereto to form with the internal surface a chamber. First and second ports communicate with the chamber and a number of deflectors are each operable sequentially on the face of the diaphragm remote from the chamber, to urge the diaphragm towards the internal surface to form a closure or constriction which traverses the chamber. The closures or constrictions each move from the first to the second port, one of the closures being terminated after the succeeding closure has been initiated. A disadvantage of such a construction is that there is a necessity for the diaphragm to be resilient, to enable it to take up the necessary shapes, and there is a tendency for the diaphragm to flex towards the low pressure side of the pump, thus causing the "slug" of material being pumped to be of small volume. For this reason, pumps of this nature are limited both in their size and by the low rotational speeds at which they can operate.

It is now proposed to provide a diaphragm for a pump or motor device having a chamber and deflector means adapted to flex the diaphragm radially, whereby the diaphragm forms a moving wall of a variable volume pumping chamber, said diaphragm comprising a premolded flexible diaphragm, opposite end edges and said edges of said diaphragm, a longitudinally extending central zone of said diaphragm, longitudinal reinforcement within said central zone rendering the diaphragm substantially longitudinally inextensible, a peripheral clamping portion of the diaphragm extending around the full periphery thereof so as to be clampable between first and second housing parts of said pump or motor device, and means defining two longitudinal corrugations in said diaphragm, one on each side of said central zone, between said central zone and said peripheral clamping portion, said corrugations allowing flexing of the diaphragm without any resultant longitudinal or transverse distortion of said central zone.

The result of the construction of the present invention is that the length of the diaphragm remains substantially constant, whatever the position of the deflector means, and this prevents the diaphragm from collapsing from the reduced pressure zone or extending into the housing interior. This enables the pump to be operated at relatively high speeds and pressures for lighter materials including slurries. The pump is also capable of handling very heavy materials, such as mortars, and even concrete quite adequately.

The inextensibility can be produced by reinforcement fibres which extend longitudinally, that is in the direction of movement of the deflectors and transverse thereto. The reinforcement is preferably near the surface remote from the chamber, to keep the inextensibility as close as possible to the deflector means and to reduce wear.

In a preferred construction those portions over which the deflectors do not run are provided with a reinforcement in the form of fibres which extend at an angle, for example 45° to the direction of the longitudinal direction, these providing strength but allow flexing of the diaphragm. An additional flexible sheet may be provided on this face remote from the chamber, and secured at least at the inlet port end, to provide a wear sheet for the deflectors and to give adjustment to compensate for any inaccuracies in casting or in the thickness of the diaphragm and thus to ensure that the diaphragm fits snugly against the internal surfaces, when deflected by the deflector means.

In order to enable the diaphragm to be replaced readily, and to hold it securely, the diaphragm needs to be clamped properly. This is achieved by the housing including a first housing part having an internal surface and a peripheral first clamping surface surrounding the internal surface, and facing in substantially the same direction as the internal surface, and a second housing part having a peripheral second clamping surface clamping the periphery of the diaphragm against the first clamping surface.

The clamping surface on the first housing part is, preferably not flat, but includes a curved portion, which is preferably curved along an arc centred upon the axis of rotation of a rotary member carrying the deflector means, such as rollers. The clamping surface will thus be generally concave, as viewed perpendicular to the direction of movement of the deflector means, and the clamping surface on the second housing part is of cooperating convex form.

The diaphragm is preferably moulded so that its shape is such that it remains substantially undistorted when it is clamped in place and before the deflectors are placed in contact with the surface of the diaphragm remote from the internal surface of the housing. This construction means that the diaphragm only has to flex a small amount. As indicated the reinforcement may include, in addition to the longitudinal fibres, other fibers which are arranged at an angle thereto in other parts of the diaphragm to give strength, but do allow the slight flexing necessary for the diaphragm to distort without stretching in the direction of movement of the deflectors.

Further, to reduce wear it is possible to provide means to cause the rollers to continue rotation, even when they are not in contact with the diaphragm.

An additional port may be provided in the chamber at a location intermediate the first and second ports, means being provided to set the deflector means in predetermined positions relative to the ports whereby the device can be used not as a pump, but as a diverter valve for multiport diaphragm valve. This is a simple construction of valve and the arrangement could be such that the pump is operated, first of all, as a pump, with the intermediate port shut off, the intermediate port is then opened with the deflector in the fixed position, so that flow will continue to maintain a syphon.

In order that the invention may be more clearly understood, the following description is given, merely by way of example, reference being made to the accompanying drawings, in which:

FIG. 4 is a section through the embodiment of the pump shown in FIG. 1 with the roller structure removed to reveal the diaphragm in its relaxed position.

Figure 1:
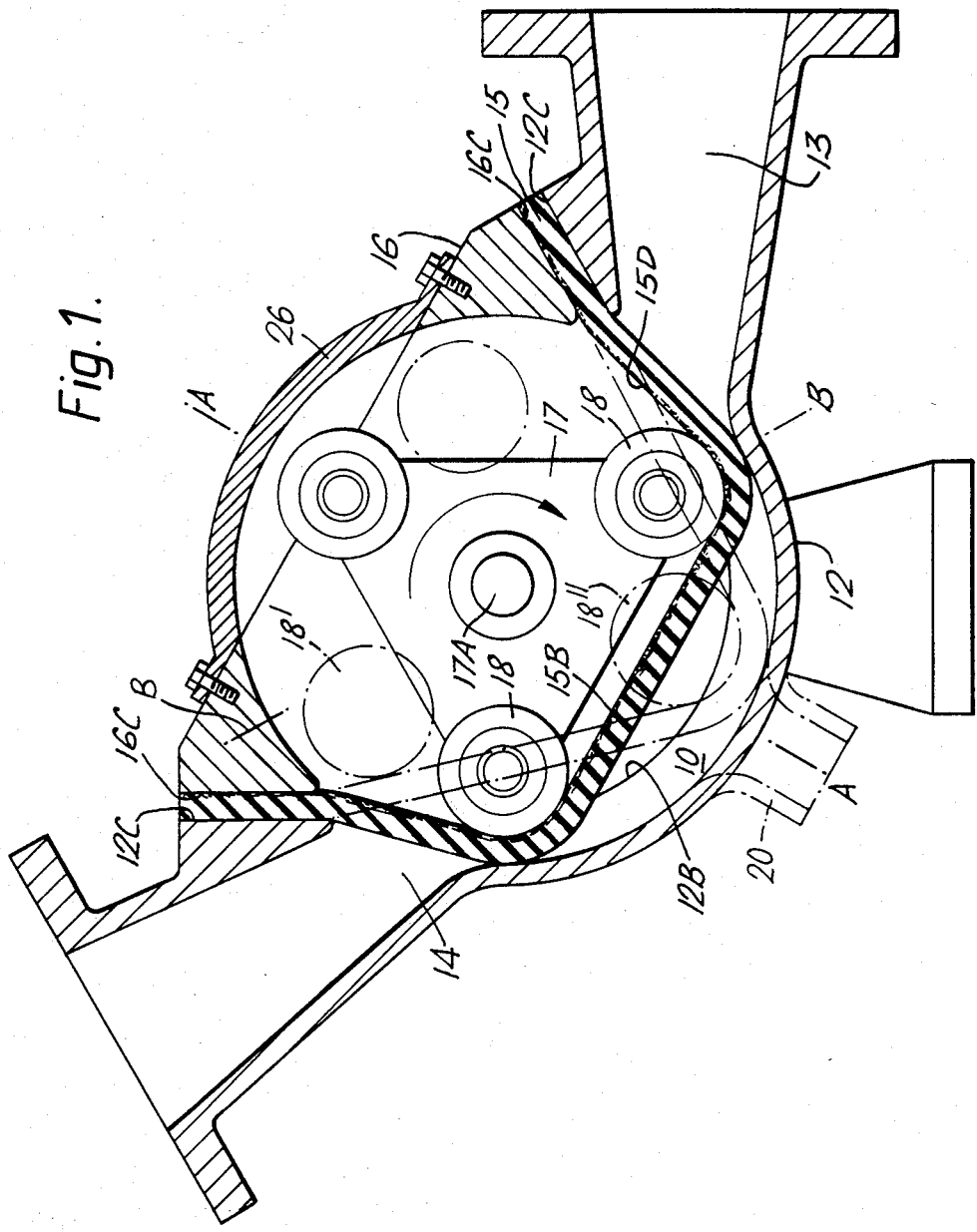
FIG. 1 is a section through one embodiment of pump 10 incorporating a diaphragm made according to the invention.
Figure 2:
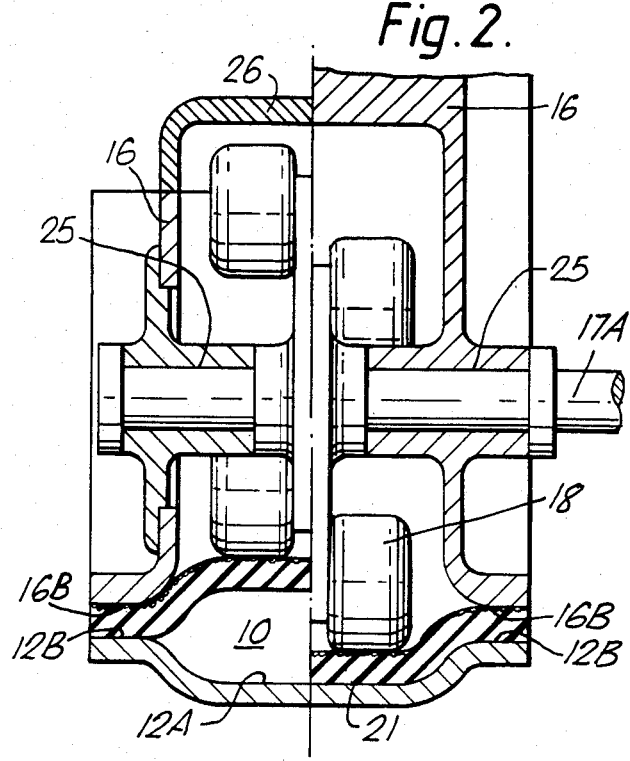
FIG. 2 is a section of two parts, the first on line A—A and the second on line B—B of the pump illustrated in FIG. 1.

Referring first to FIGS. 1 and 2 of the drawings, the pump comprises a first housing part 12 and a second housing part 16 mounted thereon. The housing part 12 includes the central dished portion having an upper internal surface 12A blending into a first port 13 and a second port 14. As can be seen from FIG. 2, the curved portion 12A has associated therewith, on each side, a raised clamping surface 12B which faces generally upwardly, that is in the same direction as the surface 12A. Curved surfaces 12B end with a straight surface at 12C at each end which extends over the ports 13 and 14.

Thus, the clamping surfaces 12B and 12C completely surround the periphery of the internal surface 12A and the ports 13 and 14.

The second housing part 16 is provided with surfaces 16B which cooperate with the curved surfaces 12B and straight surfaces 16C which cooperate with the end portion of the surface 12C so that the surfaces 16B and 16C together define a second peripheral clamping surface. These clamping surfaces 12B, 12C and 16B, 16C, are used to clamp the edge portions of a diaphragm 15 which is of the premoulded structure illustrated in FIG. 3. As will be seen it has a corrugation at 15E on each side and a central portion 21 which is lower than the edge portions 21A beyond the corrugations. The diaphragm is moulded with a reinforcement therein, including fibres 15C (FIG. 3) which extend longitudinally, that is from left to right in FIG. 1, in the central zone and includes other reinforcements 15D in other parts which are preferably at 45°, thus on the bias, to allow for some flexing, the longitudinal ones preventing extension in the longitudinal sense. These reinforcements are preferably placed on or just below the upper surface at 15B.

Referring again to FIGS. 1 and 2, it will be seen that a rotary member 17 is rotatable about a central axis 17A and is mounted in bearings 25 in the second housing part 16. Member 17 carries three rollers 18 which can bear on the upper surface 15B of the diaphragm. The rollers urge the diaphragm at spaced locations towards, and preferably against, the upper surface 12A. In this condition, the surface 12A and the diaphragm lower surface 15A form a pumping chamber 10.

The particular member in which the diaphragm is mounted enables it to be held very firmly and prevents any tendency of the diaphragm to "walk" as the rotary member 17 rotates in the direction indicated by the arrow.

Because of the configuration of the pump, the effective length of the upper surface of the diaphragm remains constant. That is, the sum of the distances, measured along the diaphragm, between the clamping surfaces 12B, 16B at one side of the pump, and the adjacent roller 18, and from that roller to the next roller, when two rollers are in contact with the diaphragm, and from the next roller to the other clamping surfaces 12B, 16B, remains constant regardless of the position of the rotor and regardless of whether one or two rollers are in contact. This means that the diaphragm need not elongate at all during the action of the rollers and it is for this reason that it is possible to provide the reinforcement in the diaphragm. The reinforcement in the longitudinal direction indeed prevents the diaphragm from elongating and the reinforcement arranged on the bias prevents too much distortion, but allows an adequate amount for the flexure of the diaphragm under the action of the rollers 18. As the rotary member 17 rotates, the constricted or closed off chamber 10 is moved from the inlet 13 to the outlet 14, and because there are at least three rollers 18, the capsule thus formed is always isolated from at least one of the ports. Because the sum of the distances mentioned above is constant, a positive pumping action can take place in an adequate manner. It will be appreciated that the closure caused by one roller is terminated after the succeeding closure is initiated.

It will be appreciated that the diaphragm clamping surfaces 12B, 16B are so arranged that they partially form arcs of a circle with substantially the same centre as the rotary member. The rollers 18 are shown as being freely rotatable, but it is contemplated that they could be caused to rotate continuously thus to reduce the wear on the upper surface. An additional wear sheet 15D of flexible material may be secured above the diaphragm at the righthand side, as viewed in FIG. 1, and extend over the full path covered by the rollers 18. This not only reduces wear, but can be used to adjust the thickness of the diaphragm to take up any manufacturing tolerances in the housing part 12.

Figure 3:
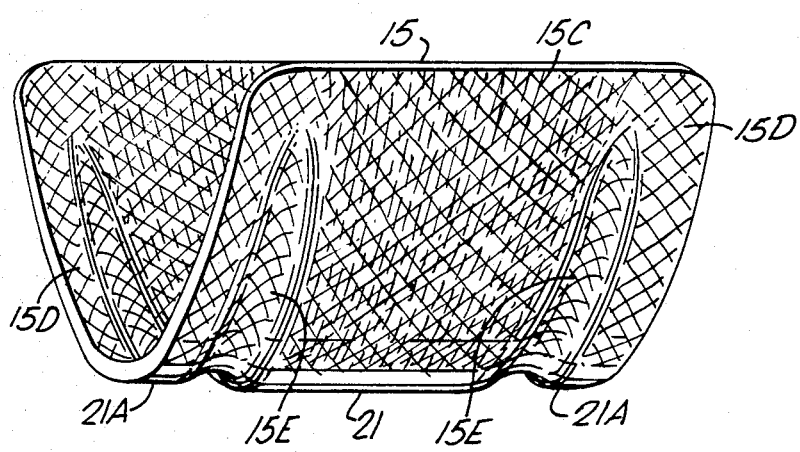
FIG. 3 is a perspective view of a diaphragm as used in the pump of FIGS. 1 and 2.

The diaphragm is preferably moulded so that it naturally has the shape illustrated in FIG. 3, that is with the lower and upper surfaces of the edge portions 21A having the same shape as the clamping surface 12B and 16B respectively. Thus, as the roller moves, the amount of distortion will be first to one side and then to the other, without ever causing any excess distortion.

The amount of diaphragm material in the moulded and reinforced diaphragm on the surface length 15B which remains substantially constant at all positions of the rollers adjacent to the rollers is such that it is only slightly in excess of that which allows the rollers to distort the diaphragm while avoiding rupture, but does not allow the diaphragm to deform further under negative pressure. The reinforcement in the diaphragm is not elastic and is moulded to the diaphragm at or near the surface on which the rollers make contact. This not only reinforces the diaphragm to cater for negative and positive pressure developed during the pumping cycle, but also reduces wear on the diaphragm due to the action of the rollers.

If the pump is provided with the modification indicated in phantom, that is with the intermediate port 20 at the centre of the chamber 10, that is at the centre of the surface 12A, then the device can be used as a valve, by moving the member 17 to the position in which the rollers take up the position 18' and 18" as illustrated in phantom. This connects the port 20 to the port 14 and disconnects the port 13. A similar symmetrical position could be assumed in which the port 13 is connected to the port 20 isolating the port 14. It is contemplated that if one rotates the member 17 continuously to cause the pumping while shutting off the port 20, then the pump could be used to start off a syphon action, the pump then being moved to the other position communicating port 13 with port 20, allowing the syphon action to continue upon opening of the port 20.

It will be seen that the second housing part 16 is provided with a removable cover 26. One of the rollers 18 is also removably mounted on the member 17. The reason for this is that, because of the shaping of the diaphragm and the configuration of the pump, it is important to clamp the diaphragm around its full periphery before any of the rollers contact the diaphragm so that the diaphragm can take up its natural position without any distortion or strain thereon during the clamping. Thus, in order to mount a new diaphragm, the second housing part 16 is removed and the used diaphragm taken away and the new diaphragm put into position. The cover 26 is removed from the second housing part, and one of the rollers is then taken off. The member 17 is rotated until the other two rollers are at the top, that is so that the zone of the removed roller is at the bottom. The second housing part is then put in place and bolted down. The dimensions of the rotary member 17 are such that the zone adjacent where the roller which had been removed is located does not touch the diaphragm, so that during the clamping operation no disturbance of the diaphragm can take place. The rotary member is then rotated until the location of the removed roller is at the top and the roller put back in place whereafter the cover 26 can be fixed.

It has been found that unless this technique is used, the diphragm is distorted and the pumping action possible with this pump reduces and indeed practically ceases.

It is thus important that the configuration of the pump should be chosen to give the necessary constant path length. This can be determined fully theoretically, but in practice it has been found possible to design the pump emperically by taking a piece of flexible inextensible material, such as cord, fitting around a model of the rotary member 17 and its rollers, and determining the position of the clamps which provide a fully tensioned cord at all times.

While the device has been described as a pump, it could equally well be used as a compressor or indeed as a motor.

The diaphragm must be flexible and may either be intrinsically substantially inextensible or can be rendered so by reinforcement. The reinforcement illustrated includes a central portion with fibres 15C extending longitudinally only. In practice, however, the reinforcement shown only at the sides at 15D will extend across the full width of the diaphragm and the central portion will have a reinforcement made of an open mesh fabric which includes the longitudinal fibres 15C and other fibres (not shown) at right angles thereto, making the diaphragm laterally inextensible.

I claim:

1. A diaphragm for a diaphragm pump or motor device, having a chamber and deflector means adapted to flex the diaphragm radially, whereby the diaphragm forms a moving wall of a variable volume pumping chamber, said diaphragm comprising a premolded flexible diaphragm, opposite end edges and side edges of said diaphragm, a longitudinally extending central zone of said diaphragm, longitudinal reinforcement within said central zone rendering the diaphragm substantially longitudinally inextensible, a peripheral clamping portion of the diaphragm extending around the full periphery thereof so as to be clampable between first and second housing parts of said pump or motor device, and means defining two longitudinal corrugations in said diaphragm, one on each side of said central zone, between said central zone and said peripheral clamping portion, said corrugations allowing flexing of the diaphragm without any resultant longitudinal or transverse distortion of said central zone.

2. A diaphragm as claimed in claim 1, and further comprising transverse reinforcement in said diaphragm to render the diaphragm substantially laterally inextensible.

3. A diaphragm as claimed in claim 2, wherein said transverse reinforcement comprises fibers extending transversely across the full width of the diaphragm.

4. A diaphragm as claimed in claim 1, wherein said diaphragm is premoulded to an arcuate shape, the center of curvature of the arc extending along an axis parallel to the surface of the diaphragm and perpendicular to said side edges, whereby the diaphragm has part cylindrical, concave and convex major surfaces.

5. A diaphragm as claimed in claim 4, wherein said central zone, between said corrugations, has a radius of curvature greater than that of the clamping portions beyond said two corrugations.

6. A diaphragm as claimed in claim 4, wherein said reinforcement is positioned within the thickness of the diaphragm closer to the concave major surface than to the convex major surface thereof.

* * * * *